US010270567B1

(12) United States Patent
Rang et al.

(10) Patent No.: US 10,270,567 B1
(45) Date of Patent: Apr. 23, 2019

(54) AVIONICS DATA NETWORKS

(71) Applicant: GE AVIATION SYSTEMS, LLC, Grand Rapids, MI (US)

(72) Inventors: John Raymond Rang, Grand Rapids, MI (US); Harry Molling, Kentwood, MI (US); Daniel Maynard Berland, Kentwood, MI (US); Timothy John Wood, Stroud (GB)

(73) Assignees: GE Aviation Systems Limited, Cheltenham, Gloucestershi (GB); GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 16/131,526

(22) Filed: Sep. 14, 2018

(51) Int. Cl.
*H04L 5/00* (2006.01)
*H04L 29/08* (2006.01)

(52) U.S. Cl.
CPC ............ *H04L 5/0044* (2013.01); *H04L 67/12* (2013.01)

(58) Field of Classification Search
CPC ............................. H04L 5/0044; H04L 67/12
See application file for complete search history.

(56) References Cited

U.S. PATENT DOCUMENTS

| 6,925,088 | B1 | 8/2005 | Moreaux |
| 7,242,683 | B2 | 7/2007 | Saint Etienne et al. |
| 8,451,860 | B2 | 5/2013 | Kinstler |
| 9,762,509 | B2 | 9/2017 | Rang |
| 9,769,082 | B2 | 9/2017 | Varadarajan |
| 2007/0230501 | A1* | 10/2007 | Bibby ............... H04L 12/413 370/468 |
| 2010/0195491 | A1* | 8/2010 | Gray .................. H04L 47/10 370/230 |
| 2015/0103734 | A1* | 4/2015 | Bobrek ............ H04L 47/6275 370/316 |
| 2016/0154391 | A1 | 6/2016 | Pavaskar et al. |
| 2017/0272366 | A1 | 9/2017 | Bush et al. |
| 2017/0331748 | A1 | 11/2017 | Mangin |

* cited by examiner

*Primary Examiner* — Afshawn M Towfighi
(74) *Attorney, Agent, or Firm* — General Electric Company; Sean M. Weinman

(57) ABSTRACT

An apparatus and method for operating an avionics data network includes a network switch core configured for a time-sensitive networking (TSN) schema, a set of TSN networking end nodes communicatively connected with the network switch core, a set of ARINC 664 part 7 (A664p7) networking end nodes communicatively connected with the network switch core, and an A664p7 legacy module connected with, or incorporated into, the network switch core and configured to receive a set of A664p7 networking data from the set of A664p7 networking end nodes.

20 Claims, 7 Drawing Sheets

AVIONICS DATA NETWORKS

BACKGROUND

For contemporary aircraft, an avionics 'platform' consists of a variety of elements such as sensors, data concentrators, a data communications network, radio frequency sensors and communication equipment, computational elements, effectors, and graphical displays. These components must share information with other components over the data communications network.

Legacy incarnations of these platform elements are in the form of individual subsystem elements often referred to as "federated systems". A federated system is an application-specific subsystem in a self-contained package having its own dedicated logic, processors, and input/output interfaces. Multiple and separated federated systems rely on common subsets of data sources, but lack the sharing of processing resources and interfaces among federated systems. A set of federated systems can be communicatively interconnected by utilizing separate data buses or a shared data network.

Network components utilized to construct the data network can utilize a specialized data protocol, including relays, switches, communicative connections, and the like, to ensure performance of the network architecture for the specialized data, as for example, under the performance of the network communications defined by the ARINC 664 part 7 specification.

BRIEF DESCRIPTION

In one aspect, aspects of the disclosure relate to an avionics data network including a network switch core configured for a time-sensitive networking (TSN) schema, a set of ARINC networking end nodes communicatively connected with the network switch core, and an ARINC legacy module connected with the network switch core and configured to receive a set of ARINC networking data from the set of ARINC networking end nodes, determine an available unallocated time slot of the TSN schema, and selectively scheduling the delivery of the set of ARINC networking data from the network switch core to another ARINC networking end node during the available unallocated time slot.

In another aspect, aspects of the disclosure relate to an avionics data network including a network switch core configured for a time-sensitive networking (TSN) schema and defining a set of allocated and unallocated time slots for delivering data by way of the network switch core, a set of ARINC networking end nodes communicatively connected with the network switch core, and an ARINC legacy module having a controller module configured to identify incoming ARINC communications from the set of ARINC networking end nodes, determine the next available unallocated time slot of the TSN schema, controllably deliver at least a subset of the identified incoming ARINC communications to at least another subset of the ARINC networking end nodes by way of the TSN schema and network switch core. The ARINC legacy module operations are configured to render the ARINC communications compliant with the TSN schema.

In yet another aspect, aspects of the disclosure relate to a method of operating a network architecture, including receiving, at a set of data ingress ports for a network switch core certified for time-sensitive networking (TSN) schema network, a set of data frames from an ARINC schema end node of the network, determining, by an ARINC legacy module, a next available unallocated time slot of the TSN schema network, selectively scheduling, by the ARINC legacy module, the set of data frames for the determined next available unallocated time slot, and delivering, by the switch core, the set of data frames, without modification of the set of data frames, to another ARINC schema end node of the network during the determined next available unallocated time slot. The ARINC legacy module operations are configured to render the ARINC communications compliant with the TSN schema.

DETAILED DESCRIPTION

Figure 1:
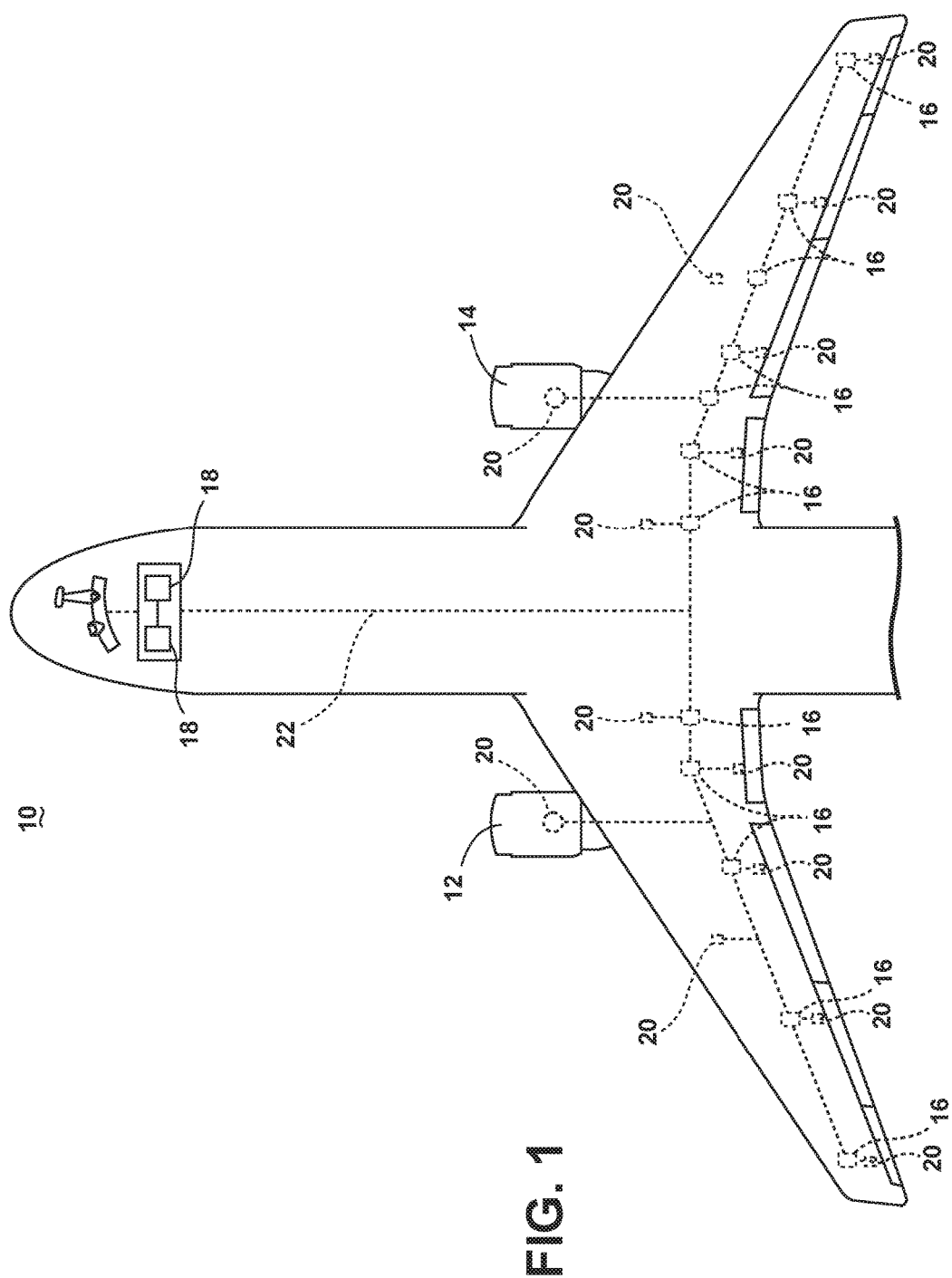
FIG. 1 is a top down schematic view of an example aircraft and avionics data network architecture of an aircraft, in accordance with various aspects described herein.

Aspects of the disclosure described herein are provided with respect to a specialized avionics data protocol, but it will be understood that the apparatus and method described herein can be implemented in any environment using a data communications network interconnecting a set of data-generating components with a set of data-consuming components. Aspects of the disclosure can include data communications networks configured to operate according to defined network characteristics or specifications. For example, contemporary aircraft operate a set of components interconnected by way of a data network defined by a network standard, such as the ARINC, or a subdivision thereof, for example, ARINC 664 part 7 ("A664p7") specification, incorporated herein in its entirety. The A664p7 specification defines compliant network operations including, but not limited to, redundancy, dedicated bandwidth, deterministic quality of service, and network switching performance. While aspects of the disclosure are described with respect to the A664p7 specification or A664p7 data frames, transmissions, and the like, the disclosure can be applicable to any legacy data transmissions.

Additional, updated or new network standards can be incorporated into contemporary aircraft in order to operate the set of interconnected components. In some instances, it is desirable to ensure the updated or new network standards are compatible with legacy systems, such as the A664p7 specification, or A664p7 data transmissions. One non-limiting example of updated or new network standards can include time-sensitive networking (TSN) based standards, specifications, or transmission schemas. A further non-limiting example of a TSN based standard can include network operations in accordance with the Institute of Electrical and Electronics Engineers (IEEE) 802.1 TSN schemas. Additional TSN schemas can be included.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements.

As used herein, a "system" or a "controller module" can include at least one processor and memory. Non-limiting examples of the memory can include Random Access Memory (RAM), Read-Only Memory (ROM), non-volatile memory (NVM, such as flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The exemplary drawings are for purposes of illustration only and the dimensions, positions, order and relative sizes reflected in the drawings attached hereto can vary.

As illustrated in FIG. 1, an aircraft 10 can include at least one propulsion engine, shown as a left engine system 12 and right engine system 14. The aircraft 10 can further include one or more aircraft computers 18, including, but not limited to data storage or processing units, or functional systems such as the flight management system or autopilot system, and a set of fixed aircraft components, such as line-replaceable units (LRU) 20, networking end nodes, or modular components of a vehicle or aircraft. In the aircraft environment, the aircraft computers or LRUs 20 can be designed to operate according to a particular operation, interoperability, or form factor standards, such as those defined by ARINC series standards. In the exemplary aspects illustrated, the aircraft computers 18 can be positioned near the nose or cockpit of the aircraft 10 and the LRUs 20 can be positioned throughout the aircraft 10. The aircraft computers 18 and LRUs 20 can be configured to be communicatively coupled by way of a series of data transmission pathways 22, network relays, or network switches 16. The data transmission pathways 22 can include a physical connection between the respective components 18, 20, such as a wired connection including Ethernet, or can include wireless transmission connections, including, but not limited to, WiFi (e.g. 802.11 networks), Bluetooth, and the like. Collectively, the aircraft computers 18, LRUs 20, pathways 22, and switches 16 can form an avionics data network for the aircraft.

The LRUs 20 can include, for example, entirely contained systems, sensors, radios, or other auxiliary equipment to manage or operate aircraft functions. At least a set of aircraft computers 18 or LRUs 20 can, for example, generate data, which can be modified, computed, or processed prior to, or in preparation for packaging the data into data frames to be transmitted over the avionics data network by way of the pathways 22 or switches 16. At least another set of aircraft computers 18 or LRUs 20 can, for example, consume the data transmitted over the avionics data network. In some instances, a single aircraft computer 18 or LRU 20 can operate to both generate and consume data. As used herein, "consume," "consuming," or "consumption" of data will be understood to include, but is not limited to, performing or executing a computer program, routine, calculation, or process on at least a portion of the data, storing the data in memory, or otherwise making use of at least a portion of the data.

The illustrated aircraft 10 aspects is merely one non-limiting example of an aircraft 10 that can be used in aspects of the disclosure described herein. Particularities of the illustrated aircraft 10 aspects, including relative size, length, number of engines, type of engines, and location of various components are not germane to the aspects of the disclosure, unless otherwise noted.

In some example components, such as the aircraft computers 18 or LRUs 20, the components can be removably fixed to the aircraft for maintenance, diagnostics, or repair purposes, but statically fixed during, for example, flight. Additionally, while aircraft computers 18 and LRUs 20 are described, any data generating or data receiving or consuming components fixed relative to an aircraft can be included as aspects of the disclosure as fixed components. For example, systems such as a flight management system, primary flight display, cockpit display system, autopilot, or autoland systems can be considered fixed components, as used herein.

Figure 2:
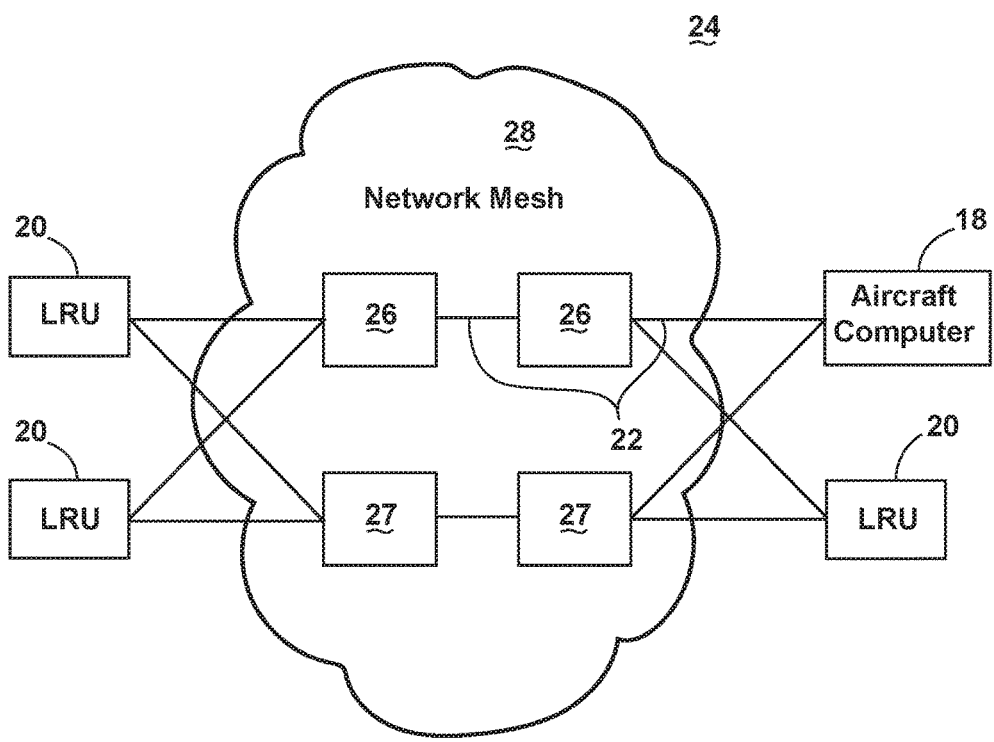
FIG. 2 is a schematic view of an example avionics data network of FIG. 1, in accordance with various aspects described herein.

FIG. 2 illustrates a non-limiting schematic view of an avionics data network 24, according to aspects of the disclosure. The avionics data network 24 can include, but is not limited to, a set of redundant network switching units, such as a first set of switching units 26 defining a first path and a second set of switching units 27 defining a second, or redundant, path. The first and second switching units 26, 27 collectively define a network mesh 28 for routing the transmission of data frames to and from the aircraft computer 18 and LRUs 20, via the transmission pathways 22. The network mesh 28 is further shown having a set of transmission pathways 22 between the network switching units 26 to provide redundancy in transmission pathways 22. In one non-limiting example, the network mesh 28, the first set of switching units 26, the second set of switching units 27, or a combination thereof, can be arranged, configured, or otherwise enabled to utilize a TSN based transmission schema. The aspects of the disclosure illustrated in FIG. 2 is merely one representation of the avionics data network 24, and alternative configurations, organization, and component quantities, including, but not limited to, aircraft computers 18, LRUs 20, or network switching units 26, are envisioned.

Figure 3:
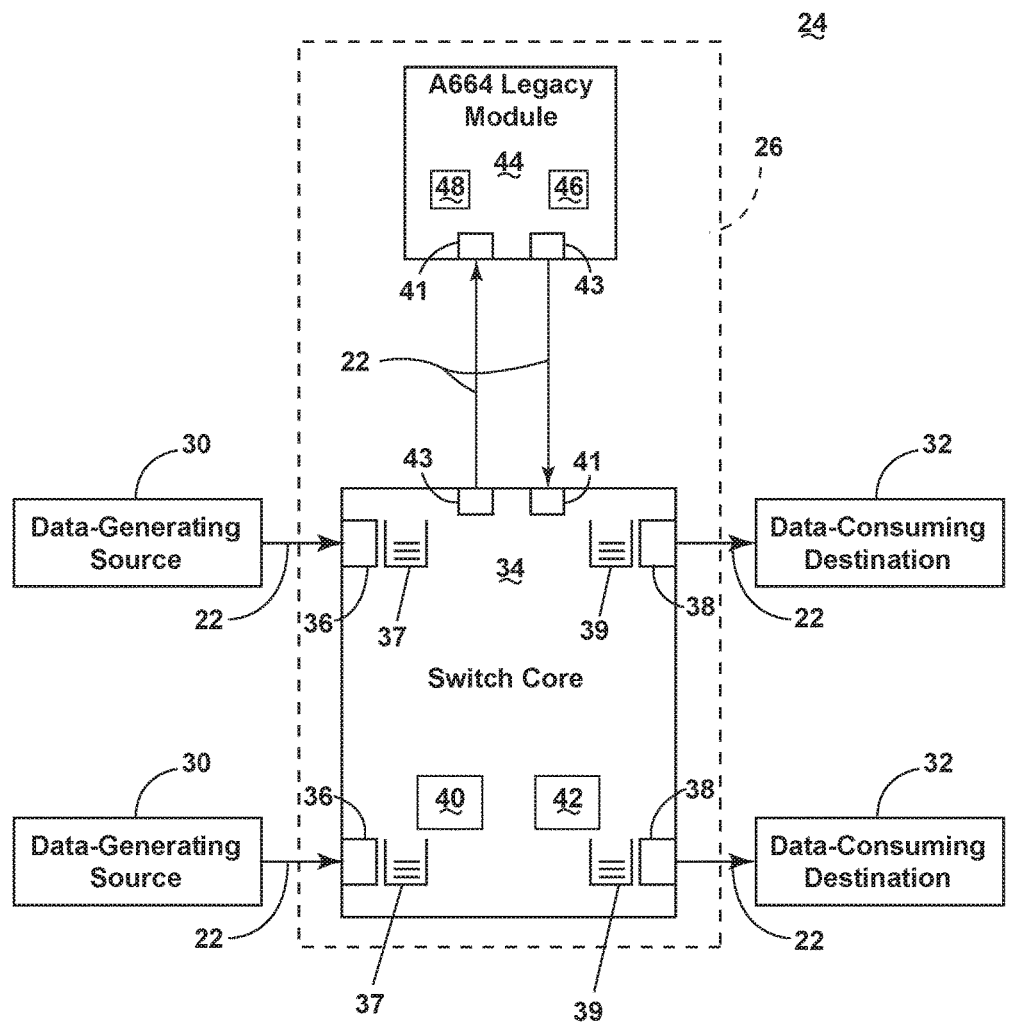
FIG. 3 is a schematic view of a network switch of the avionics data network having a legacy module, in accordance with various aspects described herein.

Turning now to FIG. 3, a simplified avionics data network 24 is illustrated, wherein a set of data-generating sources 30 are communicatively coupled with a set of data-consuming destinations 32, by way of a single network switching unit 26 via corresponding transmission pathways 22. Only a single network switching unit 26 is illustrated for ease of understanding, and it will be understood that any number of, or subset of the network switching units 26 of the avionics data network 24 can be further include or configured, as shown. Moreover, as explained above, the data-generating sources 30 or data-consuming destinations 32 can include any of the aforementioned aircraft computers 18 or LRUs 20, and are described herein as sources 30 or destinations 32 to provide a directional description of the data transmission. In this sense, each of the sources 30 or destinations 32 can be considered a networking end node.

The network switching unit 26 can further comprise a switch core 34 having at least one ingress port 36, at least one egress port 38, switching logic 40, and a controller module 42. Each respective ingress port 36 can include an associated ingress memory buffer 37, and each respective egress port 38 can include an associated egress memory buffer 39 or egress port 38 queue. The memory size and capabilities of the respective buffers 37, 39 can vary, as desired. The network switching unit 26 can also include a legacy module 44 having an ingress port 41, an egress port 43, a processor or controller module 46, and memory 48. In the non-limiting example illustrated, the legacy module 44 can be positioned, located, or disposed away from or apart from (e.g. removed from, or as a separate physical or virtual component) from the switch core 34. In this sense, the legacy module 44 can be separately configured, enabled, replaced, updated, or otherwise functionally adapted, relative to the switch core 34 or the network switching unit 26.

The switch core 34 can be configured to couple with the set of data-generating sources 30 via the transmission pathways 22 received in respective ingress ports 36 of the switch core 34 and supply networking data, network communications, data frames, data packets, or the like (hereafter, "data frames"), generated by the sources 30 to the switch core 34. Likewise, the switch core 34 can be configured to couple with the data-consuming sources 32 via the transmission pathways 22 received in the respective egress ports 38 of the core 34 and send data frames destined for the destinations 32 from the switching switch core 34. It is understood that the data frames can include at least a portion of data defining the data-generating source 30 of the respective data frame, as well as the predetermined data-consuming destination or destinations 32 of the data frame.

As shown, the switching core 34 provides a respective ingress or egress port 36, 38 for the data-generating source 30 or data-consuming destination 32, however alternative configurations are envisioned. For example, one alternative configuration envisions a single ingress or egress port 36, 38 is configured to couple with a second network switching unit 26, and can thus carry data frames for any data-consuming destination 32 coupled with the second network switching unit 26. In addition to the aforementioned switch core 34 ports 36, 38, the switch core 34 includes an egress port 43 configured to connect with the ingress port 41 of the legacy module 44, and an ingress port 41 configured to connect with the egress port 43 of the legacy module 44. In this sense, while the switch core 34 can be in, for example, unidirectional communication with the data-generating sources 30 (i.e. only receiving data frames from the source 30) and data-consuming destinations 32 (i.e. only sending data frames to the destination 32), the switch core 34 and the legacy module 44 can be in bidirectional communication, sending and receiving, or exchanging data frames between the components 34, 44.

A first set of transmission pathways 22 and ingress or egress ports 36, 38 of the switch core 34 can be defined by a particular pathway or communication schema utilized, for example, the A664p7 specification. For instance, when the transmission pathway 22 is an Ethernet cord, the set of ingress ports 36 and set of egress ports 38 can include physical interfaces, such as Ethernet ports configured to operate at, for example, 10/100 or Gigabit per second (or faster) bandwidth speeds. In another instance when the transmission pathway 22 is a wireless transmission, the set of ingress and egress ports 36, 38 can be one or more antennas. A second set of transmission pathways 22 and ingress or egress ports 36, 38 of the switch core 34 can alternatively or additionally be defined by a different particular pathway or communication schema utilized, for example, a TSN schema. Furthermore, in yet another non-limiting example, the network switching unit 26 can be configured or adapted to utilize the TSN schema, and thus, incorporating aspects of the disclosure to enable or otherwise facilitate legacy communications with otherwise incompatible transmission of data frames. In the non-limiting example described, the A664p7 communications or data frames generated by A664p7-compatible data-generating sources 30, or consumed by A664p7-compatible data-consuming destinations 32 can be communicated or transmitted via the TSN network switching unit 26 or the TSN switch core 34, by way of the incorporated legacy module 44, such as an A664p7 legacy module 44.

While a number of transmission pathways 22 and ingress or egress ports 36, 38, 41, 43 are described herein, aspects of the disclosure are envisioned wherein the utilized pathways 22 or ports 36, 38 are compatible with, or compliant with the TSN specification or transmission schema, and adapted to carry or transmit A664p7 compatible communications or data frames, even when the A664p7 compatible communications or data frames are otherwise incompatible with the TSN specification to transmission schema.

The switching logic 40 and the controller module 42 of the switch core 34 can operate together to route data frames of or through the switch core 34, as needed. For example, the controller module 42 can further include a processor and suitable memory for including a portion of a computer program having an executable instruction set for controlling the operation of the controller module 42 or switching logic 40. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc. that have the technical effect of performing particular tasks or implement particular abstract data types. In implementation, the one or more functions or routines of the controller module 42 can be converted to a computer program comprising a set of executable instructions, for execution by the controller or controller module 42.

In one instance, the controller module 42 can determine the predetermined data-consuming destination 32 for a data frame supplied to an ingress port 36 of the switch core 34, based at least partially on the data within the data frame. The controller module 42 can then command the switching logic 40 to route and forward the data frame to the egress port 38 (or an associated buffer 39 thereof) associated with the predetermined data-consuming destination 32 for delivery. In another instance, the controller module 42 can be configured to make a determination if a data frame received at an ingress port 36 is validated, verified, or authorized to arrive from the receiving ingress port 36. When an arriving data frame is received at an invalid, unverified, or unauthorized receiving ingress port 36, the controller module 42 can be configured to command the switching logic 40 to, for example, ignore or drop the data frame without forwarding the data frame on to a destination 32. In this sense, the controller module 42 can be configured to ensure only authorized data frames are transmitted through the avionics data network 24 or network switching unit 26.

In yet another instance, the controller module 42 can be configured to command the switching logic 40 to switch, direct, or forward the data frame traffic (or aspects representative of the same) received at the one or more ingress ports 36 to the egress port 43 connected with the legacy module 44, for example, by placing the received data frames in a sequential first-in, first-out (FIFO) queue to retain timing or ordering priority. The controller module 42 can then command the switching logic 40 to switch, direct, or forward the data frames (or aspects representative thereof) returned to the switch core 34 by the legacy module 44 to the egress port 38 or egress port buffer 39 associated with the predetermined data-consuming destination 32 for delivery.

In another non-limiting instance, the legacy module 44, or controller module 46 thereof, can be adapted or configured to determine whether the legacy A664p7 data frames received from legacy data-generating sources 30 can be delivered or communicated by the TSN schema based network switching unit 26 or switch core 34. In this sense, and in accordance with the TSN schema, the legacy module 44 can receive, or define a time-based allocation for delivering network traffic in accordance with the TSN schema. Also in accordance with a TSN schema, the time-based allocation for delivering network traffic can be at least partially based on allocated time slots for particular message delivery (e.g. specific data, or specific communications between at least one data-generating source 30 or data-consuming destination 32 is allocated a specific portion of time on the network to deliver related network traffic) or unallocated time slots (wherein no specific data or communications are allotted to the respective time slot for delivery). In non-limiting examples, the allocated and unallocated time slots can be dynamically configured (e.g. at startup), manually configured, or defined by a component of the network, including but not limited to the network switching unit 26, the switch core 34, the legacy module 44, another networking component, or a combination thereof.

For instance, the legacy module 44 can be configured to identify unallocated, or even under-utilized allocated time slots, and arrange, provide for, enable, or otherwise ensure the legacy A664p7 data frames are delivered by way of the TSN schema based network switching unit 26 or switch core 34 during those unallocated under-utilized allocated time slots. In another non-limiting example, the legacy module 44 can receive at least a subset of incoming data frames received at the set of ingress ports 36 (or buffers 37 thereof), or aspects representative thereof, to identify A664p7 legacy data frames received by the network switching unit 26 or network core 34.

In another non-limiting example, the legacy module 44 can facilitate the legacy A664p7 data frame delivery by commanding, instruction, controllably delivering, or otherwise selectively scheduling the delivery of at least a subset of the data frames by way of the switching logic 40 or controller module 42 of the switch core 34. In yet another non-limiting example, the legacy module 44 can facilitate or prepare for the delivery, if for example, the selectively scheduled delivery is during a future time period, by arranging or enabling the A664p7 data frames to be copied into the egress buffer 39.

Upon reaching the selectively scheduled time slot, the switch core 34 or the network switching unit 26 can operably deliver the legacy A664p7 data frames from the egress port(s) 38 to another A664p7 based networking end node, such as one or more of the set of data-consuming destinations 32.

In another non-limiting example, aspects of the disclosure can be included wherein the legacy module 44 can be further configured to determine or ensure a respective A664p7 legacy data frame can be completely delivered (e.g. fully, without truncating) during the selected delivery time slot. For instance, if a set of data frames have been queued (e.g. in the egress buffer 39), a subset of data frames may not be deliverable based on the time slot. The legacy module 44 or the switch core 34 can be configured to estimate, predict, determine, or otherwise allocate a set of data frames that are sure to be delivered in the selected time slot, and either hold, retain, buffer, exclude, or drop data frames that are determined to be not deliverable or not completely deliverable during the selected time slot. In one non-limiting example, the delivery of the A664p7 legacy data frames can be based on a first-in, first-out (FIFO) arrangement.

In this sense, aspects of the disclosure can enable or allow for the delivery of at least a subset of legacy A664p7 data frames by way of a TSN based network schema, whereby the legacy module 44 operations are configured to render the otherwise incompatible A664p7 data frames compliant with the TSN schema.

Figure 4:
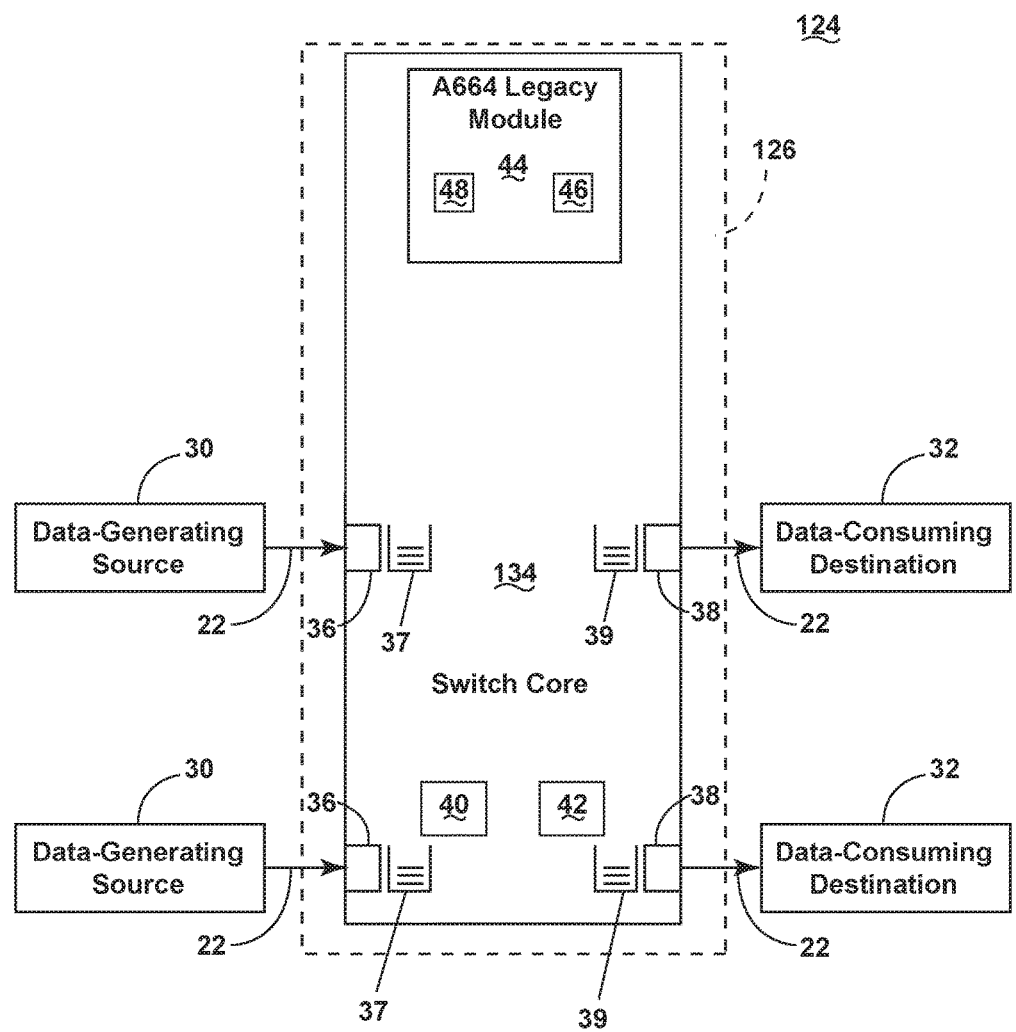
FIG. 4 is a schematic view of another network switch of the avionics data network having a legacy module, in accordance with various aspects described herein.

FIG. 4 illustrates another avionics data network 124 according to another aspect of the present disclosure. The avionics data network 124 is similar to the avionics data network 24; therefore, like parts will be identified with like numerals increased by 100, with it being understood that the description of the like parts of the avionics data network 24 applies to the avionics data network 124, unless otherwise noted. One difference is that the legacy module 44 of the network switching unit 126 is incorporated (e.g. as software or hardware) as a portion of the switch core 134. In this non-limiting example, the operation of the legacy module 44, the network switching unit 126, the switch core 134, or a combination thereof, can operate or perform as described, but without the legacy module 44 being apart from the network switching unit 126 or the switch core 134.

Figure 5:
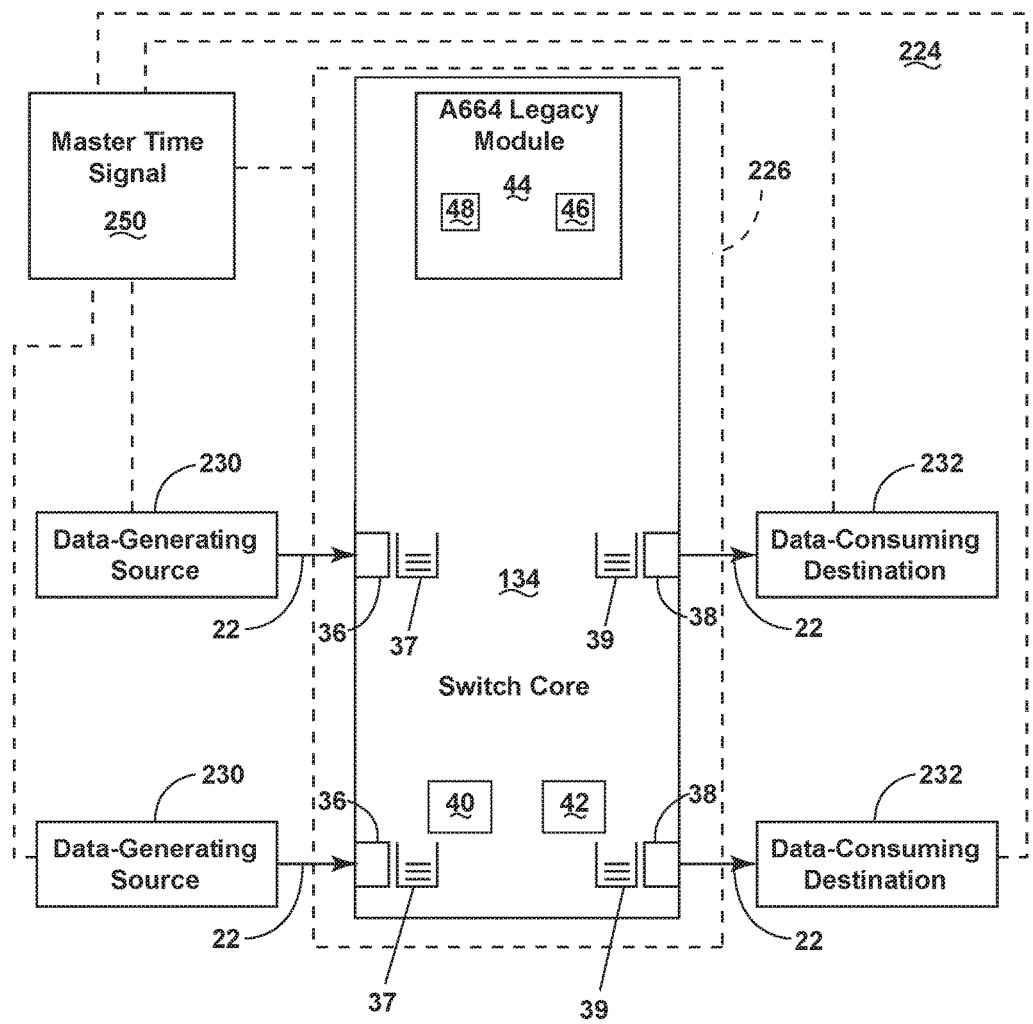
FIG. 5 is a schematic view of a network switch of the avionics data network having a legacy module and a master time signal, in accordance with various aspects described herein.

FIG. 5 illustrates another avionics data network 224 according to another aspect of the present disclosure. The avionics data network 224 is similar to the avionics data network 24, 124; therefore, like parts will be identified with like numerals increased by 200, with it being understood that the description of the like parts of the avionics data network 24, 124 applies to the avionics data network 224, unless otherwise noted. One difference is that the avionics data network 224 can include a master time signal 250 that is provided to at least a subset of the following components: the data-generating sources 230, the data-consuming destinations 232, or the network switching unit 226. In this sense, the subset of components 226, 230, 232 can receive a time synchronization value (e.g. a "master time") from the master time signal 250 for at least partial synchronization of operations.

In one non-limiting example, at least a subset of the data-generating sources 30 can be configured or adapted to transmit, send, or provide legacy A664p7 data frames during a predetermined schedule, managed or regulated by the time synchronization value. In another non-limiting example, the subset of the data-generating sources 230 can be configured or adapted to store locally (e.g. at the data-generating source 230, for instance in a buffer, not shown), and to send the locally stored legacy A664p7 data frames during the predetermined schedule.

Figure 6:
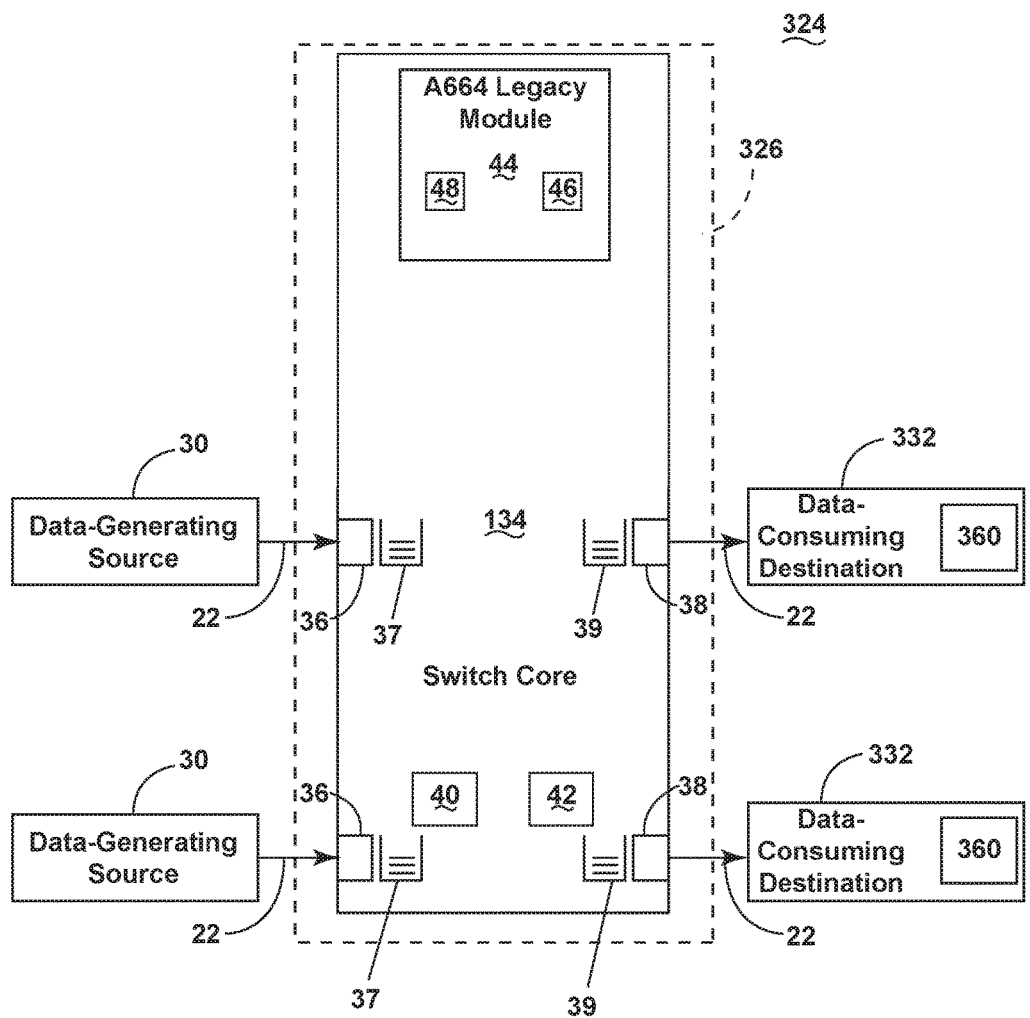
FIG. 6 is a schematic view of yet another network switch of the avionics data network having a legacy module, in accordance with various aspects described herein.

FIG. 6 illustrates another avionics data network 324 according to another aspect of the present disclosure. The avionics data network 324 is similar to the avionics data network 24, 124, 224; therefore, like parts will be identified with like numerals increased by 300, with it being understood that the description of the like parts of the avionics data network 24, 124, 224 applies to the avionics data network 324, unless otherwise noted. One difference is that the data-consuming destinations 332 or the network switching unit 324 can be configured or adapted to enable the splitting or separation of a single legacy data frame into a set of data frames or messages to be reassembled at a later time or at a downstream destination.

For example, as described with reference to FIG. 3, aspects of the disclosure can be included wherein the legacy module 44 can be further configured to determine or ensure a respective A664p7 legacy data frame can be completely delivered (e.g. fully, without truncating) during the selected delivery time slot. Aspects of the disclosure including FIG. 6 can be adapted or configured to determine whether a respective A664p7 legacy data frame can be completely delivered during the selected delivery time slot, and if not, to separate the respective A664p7 legacy data frame into a first A664p7 networking message and a second A664p7 networking message. In this example, the first A664p7 networking message can be scheduled for delivery, while the second A664p7 networking message can be further scheduled during the next unallocated or available time slot.

The data-consuming destination 332 can further include a reassembly module 360 that can be adapted or configured to receive each of the first and second A664p7 networking messages, and reassemble them to the original A664p7 legacy data frame.

Figure 7:
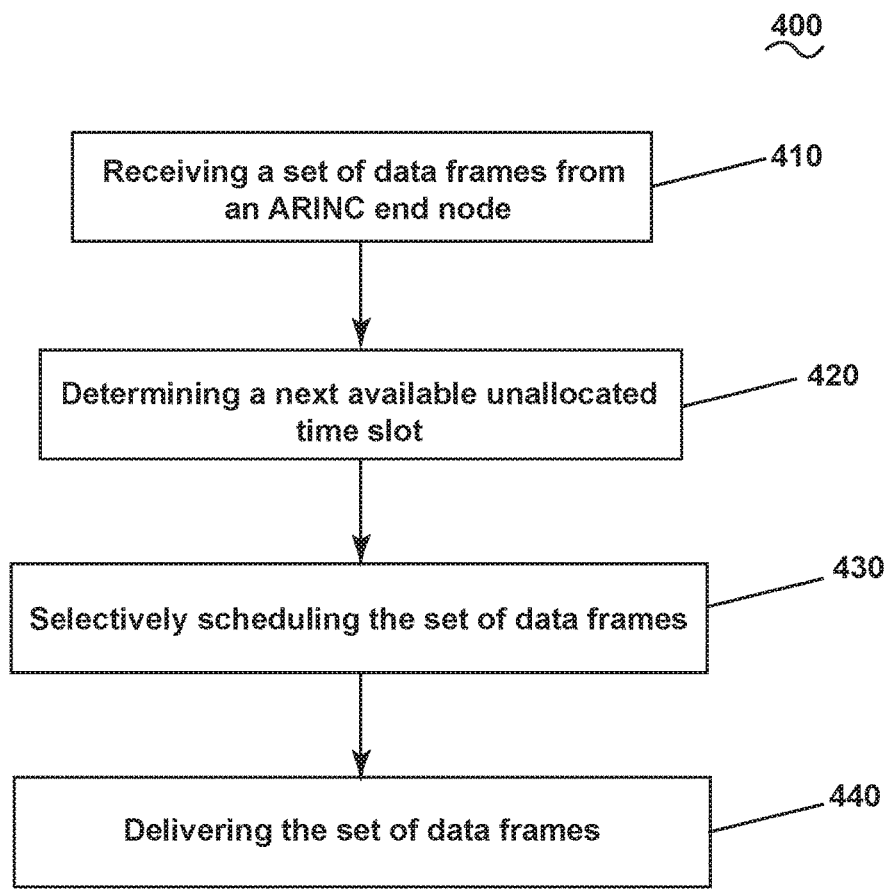
FIG. 7 is a flow chart showing a method of operating the avionics data network, in accordance with various aspects described herein.

FIG. 7 illustrates a flow chart demonstrating a method 400 of operating a network architecture 24. The method 400 begins by receiving, at a set of data ingress ports 36 for a network switch core 34 certified for time-sensitive networking (TSN) schema network, a set of data frames from an A664p7 schema end node 30 of the network 24, at 410. Next, the method 400 includes determining, by an A664p7 legacy module 44, a next available unallocated time slot of the TSN schema network, at 420. The method 400 continues by selectively scheduling, by the A664p7 legacy module 44, the set of data frames for the determined next available unallocated time slot, at 430. Then, the method 400 proceeds to delivering, by the switch core 34, the set of data frames, without modification of the set of data frames, to another A664p7 schema end node 32 of the network during the determined next available unallocated time slot, at 440. The A664p7 legacy module 44 operations are configured to render the A664p7 communications compliant with the TSN schema.

The sequence depicted is for illustrative purposes only and is not meant to limit the method 400 in any way as it is understood that the portions of the method can proceed in a different logical order, additional or intervening portions can be included, or described portions of the method can be divided into multiple portions, or described portions of the method can be omitted without detracting from the described method. For example, the method 400 can further include determining, by the A664p7 legacy module 44 or the switch core 34, whether at least a subset of the data frames can be completely delivered during the next available unallocated time slot, or delivering the set of data frames further includes delivering the subset of the data frames determined to be completely delivered during the next available unallocated time slot.

Many other possible aspects and configurations in addition to that shown in the above figures are contemplated by the present disclosure.

The aspects disclosed herein provide an avionics data network for receiving and delivering a set of data frames. The technical effect is that the above described aspects enable the delivery of legacy A664p7 data frame in a TSN based network by way of the legacy module 44 enabling the delivery of the data frames during underutilized or unallocated time slots. In this sense, different, otherwise non-compatible network schemas can effectively coexist on a single network. One advantage that can be realized in the above aspects is that the above described aspects will permit the use of legacy A664p7 equipment to be used along with equipment that supports the newer TSN protocol. Another advantage can include providing a deterministic Ethernet solution to aircraft customers, allowing, enabling, or otherwise accelerating the transition from several older network schemas to a new network schema.

To the extent not already described, the different features and structures of the various aspects can be used in combination with others as desired. That one feature cannot be illustrated in the aspects is not meant to be construed that it cannot be, but is done for brevity of description. Thus, the various features of the different aspects can be mixed and matched as desired to form new aspects, whether or not the new aspects are expressly described. All combinations or permutations of features described herein are covered by this disclosure.

This written description uses examples to disclose aspects of the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An avionics data network comprising:
  a network switch core configured for a time-sensitive networking (TSN) schema;

a set of ARINC 664 part 7 (A664p7) networking end nodes communicatively connected with the network switch core; and an A664p7 legacy module connected with the network switch core and configured to receive a set of A664p7 networking data from the set of A664p7 networking end nodes, determine an available unallocated time slot of the TSN schema, and selectively scheduling the delivery of the set of A664p7 networking data from the network switch core to another A664p7 networking end node during the available unallocated time slot.

2. The avionics data network of claim 1 wherein the set of A664p7 networking end nodes are otherwise incompatible with the TSN schema.

3. The avionics data network of claim 1 wherein the TSN schema is in accordance with Institute of Electrical and Electronics Engineers (IEEE) 802.1 TSN schemas.

4. The avionics data network of claim 1 wherein at least a subset of the A664p7 networking end nodes further receives a time synchronization value.

5. The avionics data network of claim 4 wherein the subset of the A664p7 networking end nodes are configured to send A664p7 networking data, received by the A664p7 legacy module, during a predetermined schedule.

6. The avionics data network of claim 5 wherein the subset of A664p7 networking end nodes generate A664p7 networking data asynchronously, and locally store the generated A664p7 networking data until sending during the predetermined schedule.

7. The avionics data network of claim 1 wherein the A664p7 legacy module is apart from the network switch core.

8. The avionics data network of claim 1 wherein the A664p7 legacy module is further configured to determine whether at least a subset of the A664p7 networking data can be completely delivered during the available unallocated time slot.

9. The avionics data network of claim 8 wherein the A664p7 legacy module is further configured to selectively schedule the delivery of the subset of the A664p7 networking data upon determining the subset of the A664p7 networking data can be completely delivered during the available unallocated time slot.

10. The avionics data network of claim 8 wherein the A664p7 legacy module is further configured to divide the subset of the A664p7 networking data into at least a first A664p7 networking message and a second A664p7 networking message upon determining the subset of the A664p7 networking data cannot be completely delivered during the available unallocated time slot, and further configured to selectively schedule the delivery of the first A664p7 networking message.

11. The avionics data network of claim 10 wherein the A664p7 legacy module is further configured to selectively schedule the delivery of the second A664p7 networking message during another unallocated time slot.

12. The avionics data network of claim 11 wherein the another A664p7 networking end node is configured to reassemble the first and second A664p7 network messages.

13. The avionics data network of claim 1 wherein the network switch core includes an egress port queue, and wherein selectively scheduling the delivery of the set of A664p7 networking data from the network switch core to another A664p7 networking end node includes queuing the set of A664p7 networking data in the egress port queue.

14. An avionics data network comprising:
a network switch core configured for a time-sensitive networking (TSN) schema and defining a set of allocated and unallocated time slots for delivering data by way of the network switch core;

a set of ARINC 664 part 7 (A664p7) networking end nodes communicatively connected with the network switch core; and an A664p7 legacy module having a controller module configured to identify incoming A664p7 communications from the set of A664p7 networking end nodes, determine the next available unallocated time slot of the TSN schema, controllably deliver at least a subset of the identified incoming A664p7 communications to at least another subset of the A664p7 networking end nodes by way of the TSN schema and network switch core;

wherein the A664p7 legacy module operations are configured to render the A664p7 communications compliant with the TSN schema.

15. The avionics data network of claim 14 wherein the A664p7 legacy module is apart from the network switch core.

16. The avionics data network of claim 14 wherein the A664p7 legacy module is further configured to determine whether at least a subset of the A664p7 communications can be completely delivered during the next available unallocated time slot.

17. The avionics data network of claim 16 wherein the A664p7 legacy module is further configured to controllably deliver of the subset of the A664p7 communications upon determining the subset of the A664p7 communications can be completely delivered during the next available unallocated time slot.

18. A method of operating a network architecture comprising:
receiving, at a set of data ingress ports for a network switch core certified for time-sensitive networking (TSN) schema network, a set of data frames from an ARINC 664 part 7 (A664p7) schema end node of the network;

determining, by an A664p7 legacy module, a next available unallocated time slot of the TSN schema network;

selectively scheduling, by the A664p7 legacy module, the set of data frames for the determined next available unallocated time slot; and delivering, by the switch core, the set of data frames, without modification of the set of data frames, to another A664p7 schema end node of the network during the determined next available unallocated time slot;

wherein the A664p7 legacy module operations are configured to render the A664p7 communications compliant with the TSN schema.

19. The method of claim 18, further comprising determining, by the A664p7 legacy module, whether at least a subset of the data frames can be completely delivered during the next available unallocated time slot.

20. The method of claim 19 wherein the delivering the set of data frames includes delivering the subset of the data frames determined to be completely delivered during the next available unallocated time slot.

* * * * *